(12) United States Patent
Deboy et al.

(10) Patent No.: US 9,444,363 B1
(45) Date of Patent: Sep. 13, 2016

(54) CIRCUIT ARRANGEMENT WITH A RECTIFIER CIRCUIT

(71) Applicant: Infineon Technologies Austria AG, Villach (AT)

(72) Inventors: Gerald Deboy, Klagenfurt (AT); Anthony Sanders, Weissenfeld (DE); Rolf Weis, Dresden (DE)

(73) Assignee: Infineon Technologies Austria AG, Villach (AT)

( * ) Notice: Subject to any disclaimer, the term of this patent is extended or adjusted under 35 U.S.C. 154(b) by 8 days.

(21) Appl. No.: 14/630,217

(22) Filed: Feb. 24, 2015

(51) Int. Cl.
 *H02M 7/217* (2006.01)
(52) U.S. Cl.
 CPC .................... *H02M 7/217* (2013.01)
(58) Field of Classification Search
 CPC ........ H02M 7/217; H02M 7/25; H02J 9/061; H03K 17/302; H03K 2017/307; Y10T 307/724
 USPC ........... 363/17, 20, 21.04, 21.06, 37, 67, 89, 363/126, 127, 132; 323/222, 224, 271–276; 307/64–66
 See application file for complete search history.

(56) References Cited

U.S. PATENT DOCUMENTS

| | | | | |
|---|---|---|---|---|
| 5,796,274 A | * | 8/1998 | Willis | H03K 17/162 307/44 |
| 5,945,816 A | * | 8/1999 | Marusik | G05F 1/56 307/86 |
| 7,466,573 B2 | * | 12/2008 | Kojori | H02J 1/10 323/271 |
| 8,569,842 B2 | * | 10/2013 | Weis | H01L 27/0623 257/194 |
| 9,178,439 B2 | * | 11/2015 | Hwang | H02M 3/3376 |

* cited by examiner

*Primary Examiner* — Rajnikant Patel
(74) *Attorney, Agent, or Firm* — Slater Matsil, LLP

(57) ABSTRACT

In accordance with an embodiment, a method includes receiving by a drive circuit electrical power from a voltage tap of a first rectifier circuit that includes a load path and a voltage tap, and using the electrical power by the drive circuit to drive a second rectifier circuit that includes a load path. The load path of the first rectifier circuit and the load path of the second rectifier circuit are coupled to a common circuit node.

24 Claims, 11 Drawing Sheets

CIRCUIT ARRANGEMENT WITH A RECTIFIER CIRCUIT

TECHNICAL FIELD

This disclosure in general relates to an electronic circuit arrangement including a rectifier circuit and, more particularly, an active rectifier circuit.

BACKGROUND

Rectifiers are electronic circuits or electronic devices that allow a current to flow in a first direction, while substantially preventing a current to flow in an opposite second direction. Such rectifiers are widely used in a variety of electronic circuits in automotive, industrial and consumer applications, in particular in power conversion and drive applications.

Conventional rectifiers can be implemented with a diode that conducts a current when forward biased and that blocks when reverse biased. A diode, however, causes relatively high losses when forward biased. These losses are proportional to the current through the diode. In particular in power conversion application or power supply applications in which high current may flow through the rectifier, significant losses may occur.

There is therefore a general need to provide a circuit arrangement with a rectifier circuit that has reduced losses.

SUMMARY

One embodiment relates to a circuit arrangement. The circuit arrangement includes a first rectifier circuit with a load path and a voltage tap, a second rectifier circuit with a load path and a drive input, and configured to be switched on and off by a drive signal received at this drive input, and a drive circuit with a first supply input coupled to the voltage tap of the first rectifier circuit and a first drive output coupled to the drive input of the second rectifier circuit. The load path of the first rectifier circuit and the load path of the second rectifier circuit are coupled to a common circuit node, and the drive circuit is configured to drive at least the second rectifier circuit using electrical power received from the voltage tap of the first rectifier circuit.

One embodiment relates to a method. The method includes receiving by a drive circuit electrical power from a voltage tap of a first rectifier circuit comprising a load path and a voltage tap, and using the electrical power by the drive circuit to drive a second rectifier circuit comprising a load path. The load path of the first rectifier circuit and the load path of the second rectifier circuit are coupled to a common circuit node.

BRIEF DESCRIPTION OF THE DRAWINGS

Examples are explained below with reference to the drawings. The drawings serve to illustrate certain principles, so that only aspects necessary for understanding these principles are illustrated. The drawings are not to scale. In the drawings the same reference characters denote like features.

DETAILED DESCRIPTION OF ILLUSTRATIVE EMBODIMENTS

In the following detailed description, reference is made to the accompanying drawings. The drawings form a part of the description and by way of illustration show specific embodiments in which the invention may be practised. It is to be understood that the features of the various embodiments described herein may be combined with each other, unless specifically noted otherwise.

Figure 1:
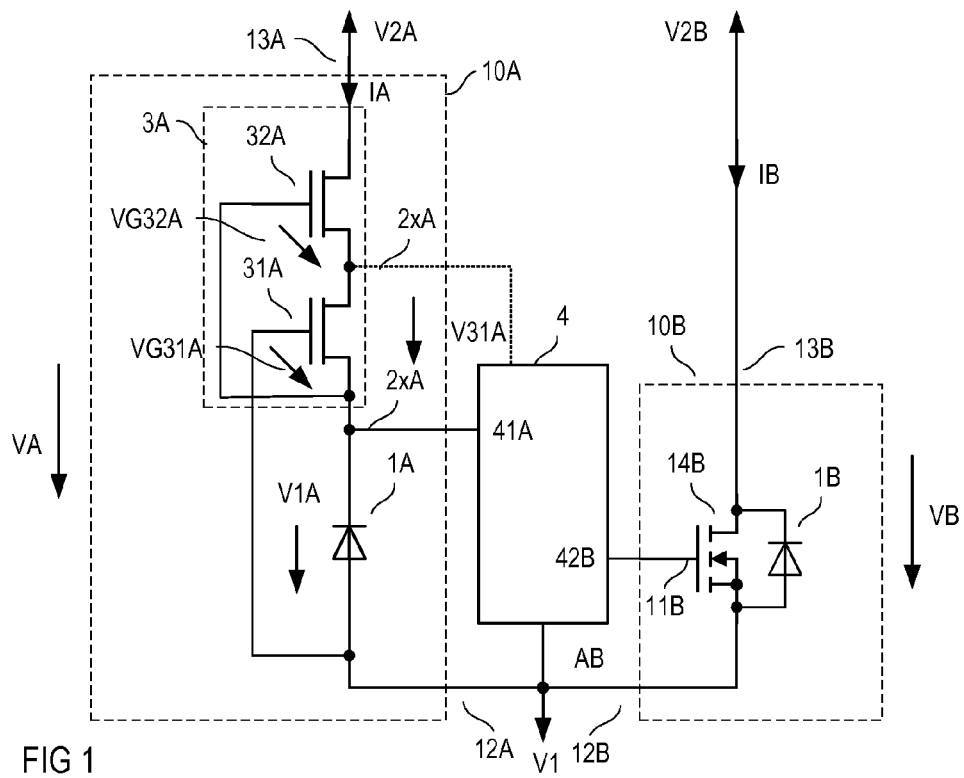
FIG. 1 shows one embodiment of a circuit arrangement including a first rectifier circuit, a second rectifier circuit, and a drive circuit.

FIG. 1 shows one embodiment of a circuit arrangement that may be used for rectifying at least one electrical current in an electronic circuit. Examples of electronic circuits in which this circuit arrangement may be used are explained herein below. Referring to FIG. 1, the circuit arrangement includes a first rectifier circuit 10A and a second rectifier circuit 10B. The first rectifier circuit 10A includes a load path between a first load node 12A and a second load node 13A and a voltage tap 2xA. The second rectifier circuit 10B includes a load path between a first load node 12B and a second load node 13B, and a drive input 11B. The second rectifier circuit 10B is configured to be switched on and off by a drive signal received at the drive input 11B.

In context with the present description, a "voltage tap" is a connection point along a load path of a rectifier circuit where a voltage prevailing at this connection point can be tapped. For example, a voltage tap is a connection point between two circuit elements that are part of the load path.

A drive circuit 4 includes a first supply input 41A coupled to the voltage tap 2xA of the first rectifier circuit 10A and a first drive output 42B coupled to the drive input 11B of the second rectifier circuit 10B. The drive circuit 4 is configured to drive at least the second rectifier circuit 10B using electrical power received from the voltage tap 21A of the first rectifier circuit 10A. This is explained with reference to embodiments of the drive circuit 4 in further detail below.

The load paths of the first rectifier circuit 10A and the second rectifier circuit 10B are coupled to a common circuit node AB by having one of their respective first and second load terminals coupled to this circuit node AB. In the embodiment shown in FIG. 1, the first load node 12A, 12B of each of the first rectifier circuit 10A and the second rectifier circuit 10B is connected to the common circuit node AB. In the embodiment shown in FIG. 1, the second load nodes 13A, 13B of the first rectifier circuit 10A and the second rectifier circuit 10B are not connected so that electrical potentials V2A, V2B at these load nodes 13A, 13B can be different. An electrical potential at the common circuit node AB is referred to as V1 in FIG. 1. The electrical potentials V1, V2A, V2B at the first and second load nodes 12A, 12B, 13A, 13B can be defined by further circuit elements of an electronic circuit in which the circuit arrangement of FIG. 1 is employed. Examples of those circuits are explained herein below.

Referring to FIG. 1, the first rectifier circuit 10A includes a series circuit with a rectifier element 1A and a transistor arrangement 2A connected in series with the rectifier element 1A. The transistor arrangement 2A includes at least one transistor 31A, 32A, which includes a load path and a drive node. In the embodiment shown in FIG. 1, the transistor arrangement 3A includes two transistors 31A, 32A. The load paths of these two transistors 31A, 32A are connected in series, whereas the series circuit with the load paths of the two transistors 31A, 32A is connected in series with the rectifier element 1A. A series circuit with the rectifier element 1A and the load paths of the transistors 31A, 32A of the transistor arrangement 2A is connected between the first load node 12A and the second load node 13A of the first rectifier circuit 10A so that this series circuit forms the load path of the first rectifier circuit 10A, or at least forms a part of the load path of the first rectifier circuit 10A. According to one embodiment, the transistors 31A, 32A of the transistor arrangement 3A are normally-on transistors. In the embodiment shown in FIG. 1, these transistors are drawn as normally-on MOSFETs. However, this is only an example, other types of normally-on transistors such as JFETs (Junction Field-Effect Transistors), HEMTs (High Electron Mobility Transistors) may be used as well. The drive nodes (gate nodes) of the individual transistors 31A, 32A are connected such that the rectifier element 1A directly or indirectly drives the transistors 31A, 32A, so that the rectifier element 1A defines the operation state of the transistor arrangement 2A. The operation state may include an on-state, in which the transistors 31A, 32A are in an on-state (switched on), and an off-state, in which the transistors 31A, 32A are in an off-state (switched off).

In the embodiment shown in FIG. 1, the rectifier element 1A and the transistors 31A, 32A are connected such that transistor 31A is driven based on a voltage V1A across the rectifier element 1A, and transistor 32A is driven based on a voltage V31A across the load path of the transistor 31A. For the purpose of explanation it is assumed, that the transistors 31A, 32A are MOSFETs, in particular n-type depletion MOSFETs. A drive voltage of these MOSFETs 31A, 32A is a gate-source voltage VG31A, VG32A, which is a voltage between a gate node and a source node of the respective MOSFET 31A, 32A. Referring to FIG. 1, the gate-source voltage VG31A of the first transistor 31A corresponds to the negative voltage −V1A across the rectifier element 1A, and the gate-source voltage VG32A of the second transistor 32A corresponds to the negative load path voltage −V31A of the transistor 31A. That is, $$VG31A=-V1A \qquad (1a)$$

$$VG32A=-V31A \qquad (1b).$$

For the purpose of explanation it is further assumed that the transistors 31A, 32A are in the on-state, when the respective gate-source voltage VG31A, VG32A is above a threshold voltage, which is zero or negative. Equivalently, transistors 31A, 32A are in the off-state, when the respective gate-source voltage VG31A, VG32A is below a threshold.

The first rectifier circuit 10A can be in an on-state, which is when the rectifier element 1A drives the transistor arrangement 2A in the on-state, and an off-state, which is when the rectifier element 1A drives the transistor arrangement 2A in the off-state. Whether the first rectifier element 10A is in the on-state or the off-state is dependent on a polarity of a voltage VA across the first rectifier circuit 10A. This voltage equals a difference V2A−V1 between the electrical potentials V2A at the second load node 13A and the electrical potential V1 at the first load node 12A. In the embodiment shown in FIG. 1, the first rectifier circuit 10A is in the off-state when the voltage VA has a polarity as shown in FIG. 1, and is in the on-state when the voltage VA has a polarity opposite the polarity shown in FIG. 1.

In the following, a voltage level (polarity) of the voltage VA which drives the first rectifier circuit 10A in the on-state will be referred to as forward biasing level of the voltage VA, and a voltage level (polarity) which drives the rectifier circuit 10A in the off-state will be referred to as reverse biasing level of the voltage VA. Driving the first rectifier circuit 10A in the on-state or the off-state dependent on the polarity of the voltage VA is explained in the following.

For the purpose of explanation it is assumed that the voltage VA increases from zero towards reverse biasing levels. When the voltage level of the voltage VA is zero or slightly above zero, transistors 31A, 32A are conducting. However, rectifier element 1A is reverse biased, that is, the voltage V1A across the rectifier elements 1A has a polarity as shown in FIG. 1. As the voltage level of the voltage VA increases, the level of the voltage V1A across the rectifier element 1A increases. As long as the transistors 31A, 32A are in the on-state, the respective load path voltages V31A, V32A are substantially zero. When the voltage V1A across the rectifier element 1A increases such that the gate-source voltage of the transistor 31A falls below its threshold level, transistor 31A switches off. A further increase of the voltage level of the voltage VA then results in an increase of the voltage level of the load path voltage V31A, while the voltage level of the voltage V1A across the rectifier element 1A is kept substantially constant. An increase of the voltage level of the load path voltage V31A of the transistor 31A may cause that the gate-source voltage VG32A of the transistor 32A to fall below the respective threshold voltage so that transistor 32A switches off. After the transistor 32A has been switched off a further increase of the voltage level of the voltage VA results in an increase of the load path voltage V32A of the transistor 32A.

In the first rectifier circuit 10A each of the rectifier element 1A and the transistors 31A, 32A, in the off-state of the rectifier circuit 10A, needs to withstand a voltage level which is lower than the overall voltage level of the voltage VA. That is, the individual elements 1A, 31A, 32A of the first rectifier circuit 10A "share" the voltage VA.

When the voltage VA across the first rectifier circuit 10A changes its polarity, the rectifier element 1A is forward biased (the voltage V1A has a polarity opposite the polarity shown in FIG. 1). This switches on the transistor 31A. When the transistor 31A is on, the load path voltage V31A is substantially zero so that transistor 32A switches on.

In the embodiment shown in FIG. 1, the voltage tap 2xA of the first rectifier circuit 10A is a circuit node between the rectifier element 1A and the transistor 31A of the transistor arrangement. However, this is only an example. In general, the voltage tap can be any circuit node between the rectifier element 1A and any of the transistors of the transistor arrangement 2A. In the off-state, the rectifier element 1A and the transistors 31A, 32A of the transistor arrangement 2A act like a voltage divider, so that the voltage between the tap 2xA and the common circuit node AB is less than the level of the voltage VA that reverse biases the rectifier circuit 10A. In the embodiment shown in FIG. 1, in which the voltage tap 21A corresponds to the circuit node between the rectifier element 1A and the transistor 31A, the voltage between the tap 21A and the common circuit node AB corresponds to the voltage V1A across the rectifier element 1A. In the off-state, the maximum level of this voltage V1A substantially corresponds to the absolute value (magnitude) of the threshold voltage of the first transistor 31A. If the voltage tap is a circuit node between the paths of the transistors 31A, 32A then the maximum voltage between the tap and the common circuit node AB corresponds to the sum of the threshold voltages of the transistors 31A, 32A. These threshold voltages can be adjusted when designing the transistors of the rectifier circuit 10A.

In the embodiment shown in FIG. 1, the second rectifier circuit 10B includes a transistor and a rectifier element connected in parallel with a load path of the transistor. According to one embodiment, the transistor is a MOSFET, such as an n-type MOSFET. In this case, the rectifier element can be an integrated body diode of the MOSFET. However, the transistor 14B of the second rectifier circuit 10B is not restricted to be implemented as a MOSFET. Any other type of transistor, in particular any other type of normally-off transistor, such as an IGBT (Insulated Gate Bipolar Transistor) or a BJT (Bipolar Junction Transistor) may be used as well. If an IGBT or a BJT is used, a rectifier element may be required in addition to the respective transistor.

Just for the purpose of explanation it is assumed that the transistor of the second rectifier circuit 10B is an n-type enhancement MOSFET. A load path (drain-source path) of this MOSFET is connected between the first load node 12B and the second load node 13B of the second rectifier circuit 10B. A gate node of this MOSFET 1B forms the drive node of the second rectifier circuit 10B.

Although the transistor arrangement 2A of the first rectifier circuit 10A is drawn to have two transistors 31A, 32A, this is only an example. The number of transistors in the transistor arrangement 2A is arbitrary and may be selected based on the maximum level of the voltage VA the first rectifier circuit 10A is supposed to withstand (block) in the reverse biased state. Basically, the voltage blocking capability of the rectifier circuit 10A increases as the number of transistors in the transistor arrangement 2A increases. The "voltage blocking capability" is the maximum voltage the rectifier circuit 10A can withstand in the reverse biased state.

Like the first rectifier circuit 10A, the second rectifier circuit 10B can be operated in a forward biased mode and a reverse biased mode. The "forward biased mode" is an operation mode in which a voltage VB across the load path (between the second load node 13B and the first load node 12B) has a polarity which forward biases the rectifier element. In the "reverse biased mode" the voltage VB has a polarity that reverse biases the rectifier element 1B. In the second rectifier circuit 10B, the rectifier element 1B is basically sufficient to provide for a proper functionality of the rectifier circuit 10B. That is, the rectifier element alone is sufficient to block when the voltage VB has a polarity that reverse biases the rectifier circuit 10B and the rectifier element 1B, respectively, and to conduct when the voltage VB has a polarity that forward biases the rectifier circuit 10B and the rectifier element, respectively. Referring to FIG. 1, the rectifier element may be implemented as a diode such as a bipolar diode, for example. A diode, however, causes relatively high losses when forward biased. These losses are proportional to the level of a current through the diode so that in applications where a high current may flow through the diode, such as in power conversion applications, significant losses may occur. Thus, as shown in FIG. 1, it can be beneficial to have a transistor 14B connected in parallel with the rectifier element 1B and to switch on the transistor 14B each time the rectifier element 1B is forward biased. If the transistor 14B is designed to have lower losses in the on-state than the diode in the forward biased state then the transistor 14B, in the on-state, bypasses the rectifier element 1B so as to reduce the losses. The rectifier element 1B may only conduct a current when the voltage VB forward biases the rectifier element 1B and the transistor 14B has not been switched on, yet, or after the transistor 14B has been switched off and the voltage VB still forward biases the rectifier element 1B.

In the circuit arrangement shown in FIG. 1, energy required to drive the transistor 14B (to switch on or switch off the transistor 14B) is derived from the tap voltage. The "tap voltage" is the voltage between the tap 2xA and the common node AB. This tap voltage will be referred to as V2xA in the following.

Figure 2:
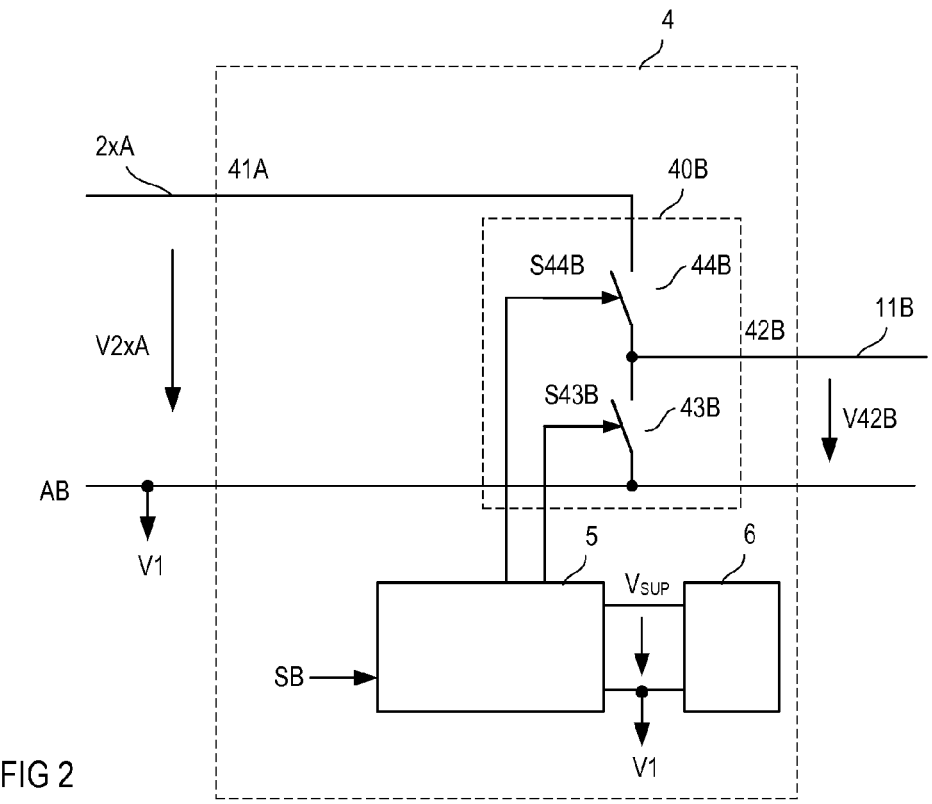
FIG. 2 shows one embodiment of the drive circuit shown in FIG. 1.

FIG. 2 shows one embodiment of the drive circuit 4 that drives the transistor 14B in the second rectifier circuit 10B using energy received at the supply input 41A from the voltage tap 2xA of the first rectifier circuit 10A. The drive circuit 4 includes a first driver 40B, which receives the tap voltage V2xA and includes a drive output connected to the drive input 11B of the second rectifier circuit 10B. In the embodiment shown in FIG. 1, the drive input 11B of the second rectifier circuit 10B corresponds to the drive node (gate node) of the transistor 14B in the rectifier circuit 10B.

In the embodiment shown in FIG. 2, the first driver 40B includes a half-bridge with a first switch 43B and a second switch 44B connected in series between the supply input 41A and the common circuit node AB so that a voltage across the half-bridge 43B, 44B corresponds to the tap voltage V2xA. The first drive output 42B of the drive circuit 4 is a circuit node common to load paths of the first switch 43B and the second switch 44B, respectively, in the half-bridge.

Referring to FIG. 2, a controller 5 controls the first driver 40B and, therefore, controls a drive signal V42B available at the first drive output 42B. In the embodiment shown in FIG. 2, the signal V42B corresponds to a voltage between the drive output 42B and the common circuit node AB. The controller 5 may be configured to drive the switches 43B, 44B of the half-bridge such that only one of these switches is switched on at the same time. If the low-side switch 43B is switched on, the drive voltage V42B is substantially zero. If the high-side switch 44B is switched on, the drive voltage V42B substantially equals the tap voltage V2xA.

For the purpose of explanation it is assumed that the transistor 14B of the second rectifier circuit 10B is switched off (in the off-state) when the drive voltage V42B is below a (positive) threshold voltage, and that the transistor is in the on-state (switched on) when the drive voltage V42B is above the threshold voltage. Thus, drive circuit 4 can switch off the transistor 14B by switching on the low side switch 43B of the first driver 40B; and the drive circuit 4 can switch on the transistor by switching on the high-side switch 44B, provided that the tap voltage V2xA is above the threshold voltage of the transistor. Referring to the explanation above, the tap voltage V2xA is positive (so that a voltage level of the tap voltage can be above the threshold voltage of the transistor) when the first rectifier circuit 10A is reverse biased. Referring to the above, it may be desirable to switch on the transistor of the second rectifier circuit 10B when the second rectifier circuit 10B is forward biased. Thus, the circuit arrangement shown in FIG. 1 is suitable to be used in an electronic circuit which requires two rectifier circuits that are forward biased and reverse biased in a complementary fashion such that one of the rectifier circuits is forward biased or unbiased when the other rectifier circuit is reverse biased. "Unbiased" means that the voltage across the rectifier circuit is substantially zero.

Referring to FIG. 2, the controller 5 controls first driver 40B and, therefore, the transistor of the second rectifier circuit 10B based on a status signal SB of the second rectifier circuit 10B. This status signal SB represents a biasing state of the second rectifier circuit 10B. That is, the status signal SB indicates whether the second rectifier circuit 10B is forward biased or reverse biased (or unbiased). The status signal SB may be obtained by sensing a current IB through the second rectifier circuit 10B. The second rectifier circuit 10B is forward biased when the current IB flows in a direction opposite the direction shown in FIG. 1. Additionally or alternatively to sensing the current IB, the status signal SB may be obtained by sensing the voltage VB across the second rectifier circuit 10B. The second rectifier circuit 10B is forward biased when the voltage VB has a polarity opposite the polarity shown in FIG. 1. Current sensing and voltage sensing circuits that may be used for sensing the current IB and/or the voltage VB are commonly known, so that no further explanations are required in this regard.

According to one embodiment, the controller 5 is an integrated circuit configured to drive the first driver 40B based on the status signal SB. The controller 5 is a micro controller, for example. In FIG. 2, S40B, S44B denote drive signals generated by the controller 5 in order to drive the low-side switch 43B and the high-side switch 44B of the first driver 40B. Each of these drive signals S43B, S44B can have an on-level which switches the corresponding switch on, or an off-level that switches the corresponding switch off. The low-side switch 43B and the high-side switch 44B can be conventional electronic switches such as transistors, for example.

Referring to FIG. 2, the drive circuit 4 further includes a supply circuit 6 that is configured to provide a supply voltage $V_{SUP}$ to the controller 5. The supply $V_{SUP}$ received by the controller 5 from the supply circuit 6 is used in the controller 5 to generate the drive signal S43B, S44B of the first driver 40B. The supply circuit 6 may further supply the current sensing circuit (not shown) or the voltage sensing circuit (not shown) that generates the status signal SB.

Figure 3:
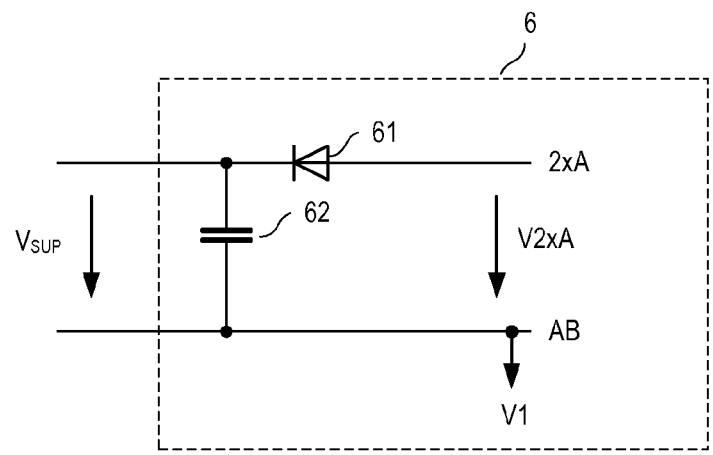
FIG. 3 shows one embodiment of a supply circuit shown in FIG. 2.

FIG. 3 shows one embodiment of the supply circuit 6. In this embodiment, the supply circuit 6 receives the tap voltage V2xA and generates the supply voltage $V_{SUP}$ from the tap voltage V2xA. Referring to FIG. 3, the supply circuit 6 may include a series circuit with a rectifier element 61, such as a diode, and a charge storage element 62, such as a capacitor. This series circuit receives the tap voltage V2xA; the supply voltage $V_{SUP}$ is available at the charge storage element 62. In this supply circuit 6, the charge storage element 62 is charged each time the tap voltage V2xA has a voltage level that is above the level of the supply voltage $V_{SUP}$ plus the forward voltage of the rectifier element 61. That is, the charge storage element 62 is charged each time the first rectifier circuit 10A is reverse biased. The rectifier element 61 prevents the charge storage element 62 from being discharged when the voltage level of the tap voltage V2xA falls below the voltage level of the supply voltage $V_{SUP}$ so that the supply circuit 6 can supply the controller 5 in those time periods in which the first rectifier circuit 10 is forward biased and in which the tap voltage V2xA is too low to supply the controller 5.

The type of circuit shown in FIG. 3 is known as "bootstrap circuit". Implementing the supply circuit 6 to include a bootstrap circuit, however, is only an example. According to another embodiment, the supply circuit 6 includes a charge pump circuit (not shown) which generates the supply voltage $V_{SUP}$ from the tap voltage V2xA. In this embodiment, the supply voltage $V_{SUP}$ can be generated to have a voltage level higher than the maximum voltage level of the tap voltage V2xA.

Figure 4:
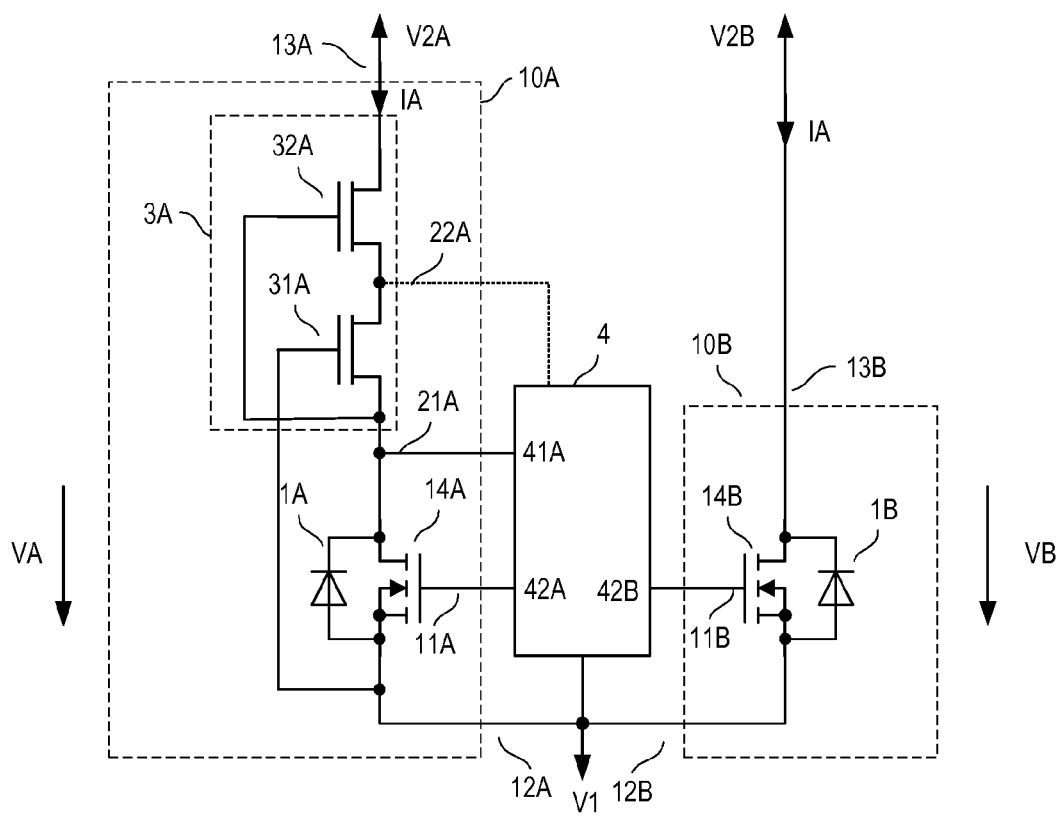
FIG. 4 shows a modification of the circuit arrangement shown in FIG. 1.

FIG. 4 shows a modification of the circuit arrangement shown in FIG. 1. In this circuit arrangement, the first rectifier circuit 10A includes a transistor 14A. This transistor 14A includes a load path connected in parallel with the rectifier element 1A and a drive node. The drive node is connected to a drive input 11A of the first rectifier circuit 10A. In this embodiment, the drive circuit 4 includes a second drive output 42A connected to the drive input 11A of the first rectifier circuit 10A. Similar to driving the transistor 14B in the second rectifier circuit 10B, the drive circuit 4 is configured to switch on the transistor 14A in the first rectifier circuit 10A when the first rectifier circuit 10A is forward biased. When the transistor 14A is switched on it bypasses the rectifier element 1A so as to reduce losses occurring in the first rectifier circuit 10A in the forward biased state.

Figure 5:
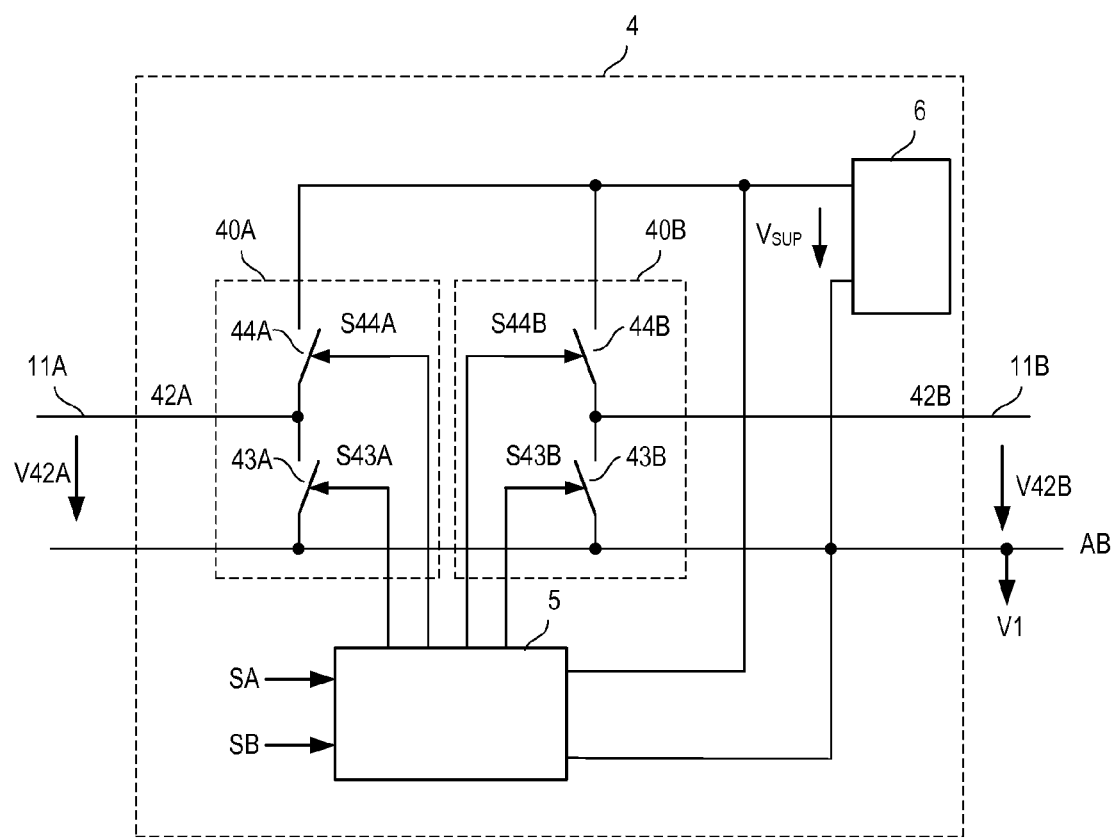
FIG. 5 shows one embodiment of a drive circuit shown in FIG. 4.

FIG. 5 shows one embodiment of a drive circuit 4 that is configured to drive the transistors 14A, 14B in both the first rectifier circuit 10A and the second rectifier circuit 10B. The drive circuit 4 shown in FIG. 5 is based on the drive circuit 4 shown in FIG. 2 and additionally includes a second driver 40A for driving the transistor 14A in the first rectifier circuit 10A. Similar to the first driver 40B, the second driver 40A includes a half-bridge circuit with a low-side switch 43A and a high-side switch 44A. The second drive output 42A is formed by a circuit node common to load paths of the low-side switch 43A and the high-side switch 44A. These switches 43A, 44A can be implemented as conventional electronic switches such as, for example, transistors. The control circuit 5 drives the low-side switch 43A and the high-side switch 44A. In FIG. 5, S43A, S44A denote drive signals generated by the controller 5 for driving the low-side switch 43A and the high-side switch 44A, respectively.

In the drive circuit 4 shown in FIG. 5, the supply circuit 6 not only supplies the controller 5, but also supplies the first and second drivers 40A, 40B. That is, the supply voltage $V_{SUP}$ is received by the controller 5 and by the half-bridge in each of the first and second drivers 40A, 40B. The supply voltage $V_{SUP}$ is a voltage that is referenced to the common circuit node AB. In FIG. 5, V42B denotes the drive voltage (drive signal) available at the first drive output 42B, and V42A denotes the drive voltage (drive signal) available at the second drive output 42A. Each of these drive voltages V42A, V42B is substantially zero (to switch the respective transistor 14A, 14B off) when the low-side switch of the respective driver 40A, 40B is in the on-state. And each of the drive voltages V42A, V42B substantially equals the supply voltage $V_{SUP}$ (to switch on the respective transistor 14A, 14B) when the high-side switch of the respective driver 40A, 40B is switched on Like in the drive circuit 4 explained with reference to FIG. 2, the low-side switch and the high-side switch of each of the drivers 40A, 40B are operated such that only one of the low-side switch and the high-side switch of each driver is switched on at the same time.

The supply circuit 6 of the drive circuit 4 shown in FIG. 5 can be implemented as explained with reference to FIG. 3. By virtue of the charge storage element 62 that provides the supply voltage $V_{SUP}$, the drive circuit 4 shown in FIG. 5 can switch on the transistor 14A in those time periods in which the first rectifier circuit 10A is forward biased and in which the tap voltage V2xA has a voltage level that is too low to switch on the transistor 14A. Like the transistor 14B in the second rectifier circuit 10B, the transistor 14A in the first rectifier circuit 10A can be implemented as a conventional transistor. Just for the purpose of illustration, it is assumed that this transistor 14A is an n-type enhancement MOSFET. In this case, the rectifier element 1A can be implemented as the body diode of the MOSFET.

The controller 5 of the drive circuit 4 shown in FIG. 5 is configured to drive the transistor 14B in the second rectifier circuit 10B based on the status signal SB as explained before. For driving the transistor 14A in the first rectifier circuit 10A, the controller 5 receives a further status signal SA. This status signal SA indicates whether the first rectifier circuit 10A is forward biased or reverse biased. For this, a current sensing circuit may evaluate a polarity of a current IA through the first rectifier circuit 10A and/or a voltage sensing circuit may evaluate a polarity of the voltage VA across the first rectifier circuit 10A. The controller 5 switches on the transistor 14A when the status signal SA indicates that the rectifier circuit 10A is forward biased.

In order to prevent that the transistors 14A, 14B are switched on when the voltage VA, VB across the respective rectifier circuit 10A, 10B changes the polarity, the status signals SA, SB may be generated such that they do not only indicate the polarity of the current IA, IB, but also indicates a current level. In this embodiment, the controller 5 may switch off the respective transistor 14A, 14B when the status signal SA, SB indicates that the current has fallen below a predefined threshold. This may indicate that the voltage VA, VB is about to change its polarity so that the drive circuit 4 switches off the respective transistor 14A, 14B.

Figure 6:
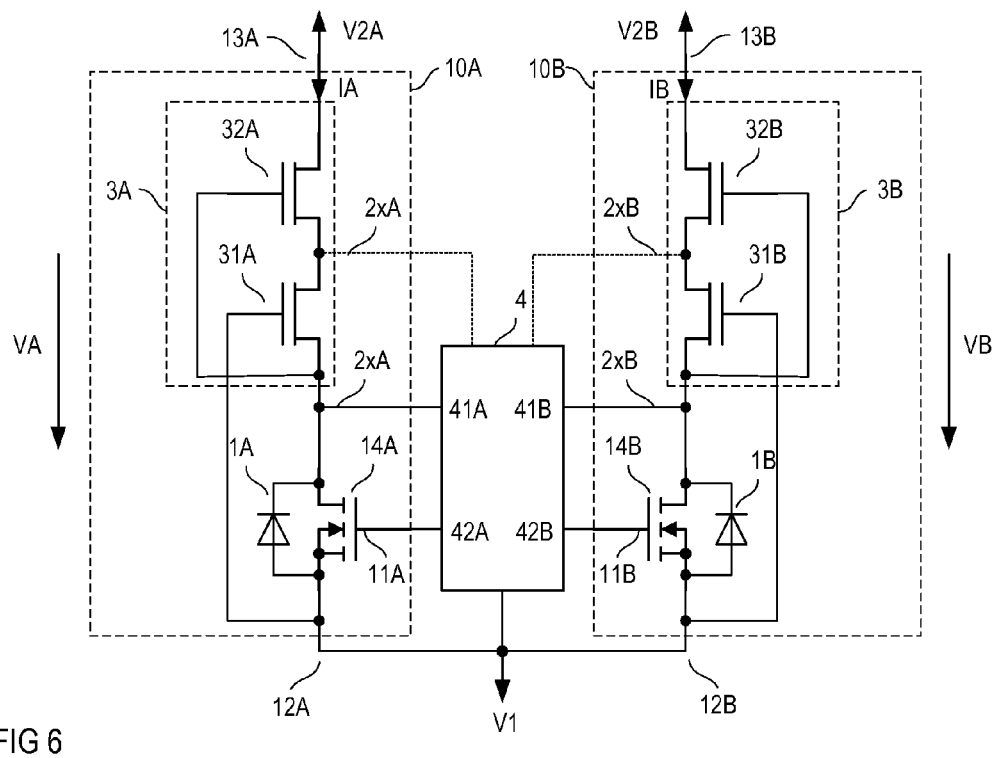
FIG. 6 shows one embodiment of a circuit arrangement including a first rectifier circuit, a second rectifier circuit, and a drive circuit.

FIG. 6 shows another embodiment of a circuit arrangement with two rectifier circuits 10A, 10B. The rectifier circuit 10A corresponds to the first rectifier circuit 10A shown in FIG. 4, to which reference is made. The second rectifier circuit 10B is based on the rectifier circuit 10B shown in FIGS. 1 and 3 and additionally includes a transistor arrangement 2B with at least one transistor (in FIG. 6, two transistors 31B, 32B are shown). That is, the second rectifier circuit 10B has the same topology like the first rectifier circuit 10A. In this context "same topology" not necessarily means that the number of transistors in the transistor arrangements 2A, 2B is identical. These transistor arrangements 2A, 2B may be implemented with the same number of transistors. However, it is also possible to have different numbers of transistors in these transistor arrangements 2A, 2B.

The operating principle of the second rectifier circuit 10B corresponds to the operating principle of the first rectifier circuit 10A explained with reference to FIGS. 1 and 2. That is, the second rectifier circuit 10B can be operated in a forward biased state or a reverse biased state. In the forward biased state, the voltage VB forward biases the rectifier element 1B so that the rectifier element 1B directly or indirectly switches on the individual transistors 31B, 32B in the transistor arrangement 3B. In the reverse biased state, the voltage VB reverse biases the rectifier element 1B so that the rectifier element 1B directly or indirectly switches off the transistors 31B, 32B of the transistor arrangement 3B. In the embodiment shown in FIG. 6, the rectifier element 1B directly switches transistor 31B and switches transistor 32B through transistor 31B, so that the rectifier element 1B indirectly switches the transistor 32B.

The second rectifier circuit 10B further includes a tap 2xB. In the embodiment shown, the tap 2xB is a circuit node between the rectifier element 1B (the transistor 14B, respectively) and the transistor 31B of the transistor arrangement. However, this is only an example. In a second rectifier circuit 10B with two or more transistors, the tap 2xB could also be a circuit node common to the load paths of two of the transistors (this is illustrated in dotted lines in FIG. 6) of the transistor arrangement.

Figure 7:
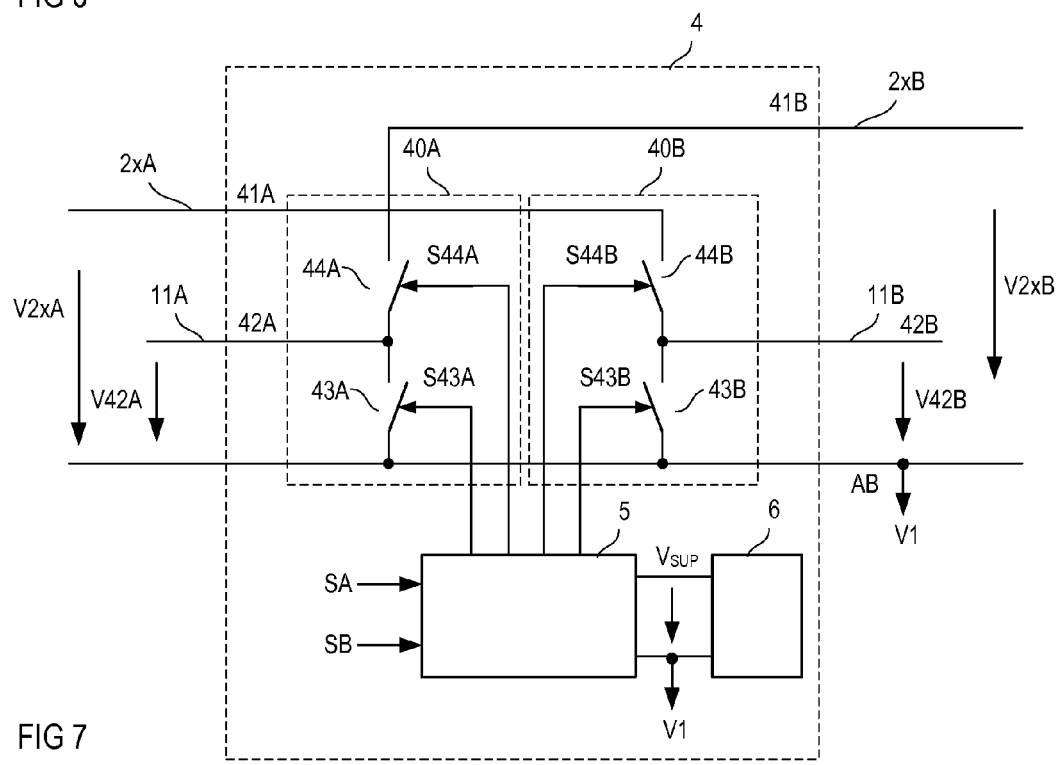
FIG. 7 shows one embodiment of the drive circuit shown in FIG. 6.

FIG. 7 shows one embodiment of a drive circuit 4 that is configured to drive the transistors 14A, 14B using first tap voltage V2xA received from the voltage tap 2xA at the first supply input 41A and a second tap voltage V2xB received by a second supply input 41B from the voltage tap 2xB. The drive circuit 4 shown in FIG. 7 is based on the drive circuit 4 shown in FIG. 5 but is different therefrom in that the supply circuit 6 only supplies the controller 5. Further, the first driver 40B receives the first tap voltage V2xA, and the second driver 40A receives the second tap voltage V2xB. Thus, the drive circuit 4 drives the transistor 14A using energy received from the tap 2xB of the second rectifier circuit 10B and drives the transistor 14B using energy received from the tap 2xA of the first rectifier circuit 10A.

The controller 5 shown in FIG. 7 is configured to drive the transistor 14A in the first rectifier circuit 10A based on the status signal SA such that it switches on the transistor 14A via the second driver 40A when the status signal SA indicates that the first rectifier circuit 10A is forward biased. In the embodiment shown in FIG. 7, the controller 5 can switch on the transistor 14A when the tap voltage V2xB provided by the second rectifier circuit 10B is above the threshold voltage of the transistor 14A. Equivalently, the controller 5 switches on the transistor 14B in the second rectifier circuit 10B when the status signal SB indicates that the second rectifier circuit 10B is forward biased.

Figure 8:
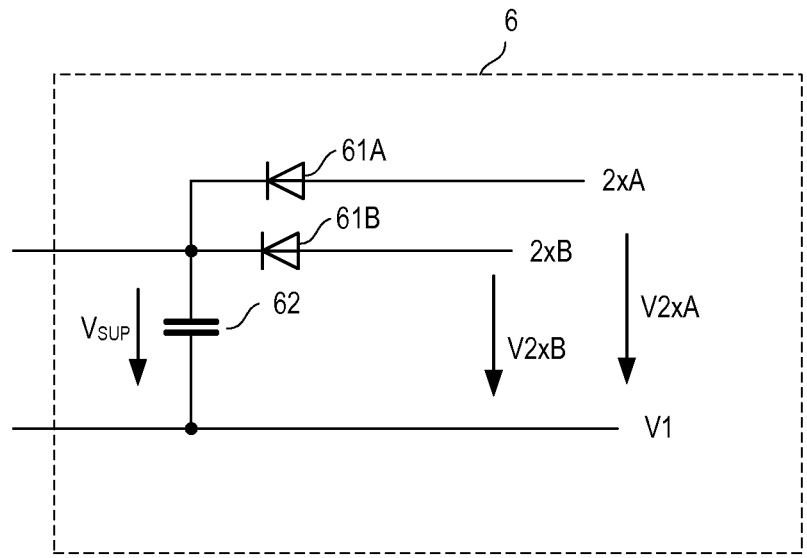
FIG. 8 shows one embodiment of a supply circuit shown in FIG. 7.

The supply circuit 6 shown in FIG. 7 can be implemented as explained with reference to FIG. 3. FIG. 8 shows another embodiment of the supply circuit 6 shown in FIG. 7. In this embodiment, the supply circuit 6 receives both the first tap voltage V2xA and the second tap voltage V2xB. The voltage tap 2xA of the first rectifier circuit 10A is coupled to this charge storage element 62 through a first rectifier element 61A; the voltage tap 2xB of the second rectifier circuit 10B is coupled to the charge storage element 62 through a second rectifier element 61B. In this supply circuit 6, the charge storage element 62 is charged each time one of the first and second tap voltages V2xA, V2xB has a voltage level that is higher than the voltage level of the supply voltage $V_{SUP}$.

According to one embodiment, the drive circuit 4 of the circuit arrangement shown in FIG. 6 is implemented with a drive circuit shown in FIG. 5. In this drive circuit, the drivers 40A, 40B receive the supply voltage $V_{SUP}$ from the supply circuit 6. The supply circuit 6 may be implemented as shown in FIG. 3 or as shown in FIG. 8. In the first case, the connection between the tap 2xB of the second rectifier circuit 10B and the drive circuit 4 can be omitted.

Figure 9:
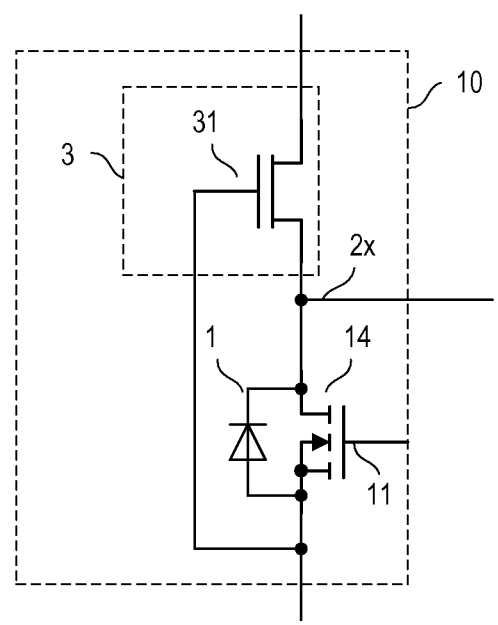
FIG. 9 shows one embodiment of a rectifier circuit.
Figure 10:
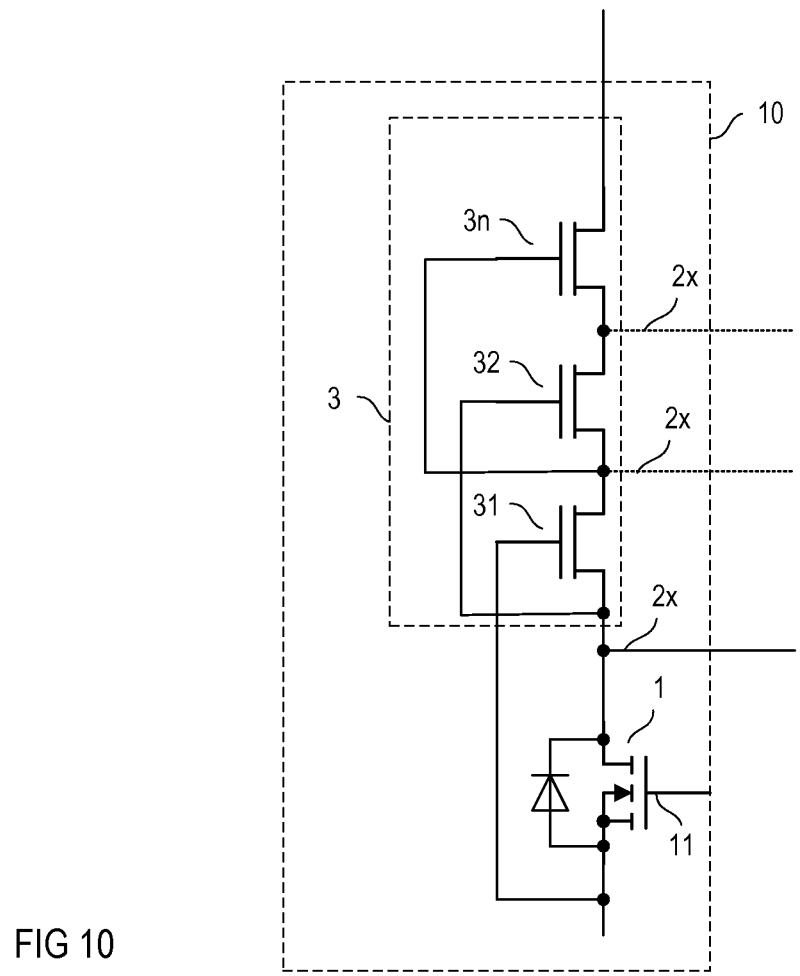
FIG. 10 shows another embodiment of a rectifier circuit.

Referring to the explanation above, the transistor arrangements 3A, 3B are not restricted to be implemented with two transistors. These transistor arrangements 3A, 3B can be designed with an arbitrary number of transistors connected in series, whereas the number of transistors can be selected dependent on the desired voltage blocking capability of the respective rectifier circuit 10A, 10B. Just for the purpose of explanation, FIGS. 9 and 10 show two further embodiments of a rectifier circuit. In FIGS. 9 and 10, reference character 10 represents one of the rectifier circuits 10A, 10B, reference character 3 represents one of the transistor arrangements 3A, 3B, reference character 1 denotes one of the rectifier elements 1A, 1B, reference character 14 represents one of the transistors 14A, 14B, reference character 11 represents one of the drive inputs 11A, 11B, and reference character 2x represents one of the voltage taps 2xA, 2xB. In the embodiment shown in FIG. 9, the transistor arrangement 3 includes only one transistor 31. This transistor 31 is directly controlled by the parallel circuit with the rectifier element 1 and the transistor 14. In this embodiment, the voltage tap 2x is a circuit node between the parallel circuit 1, 14 and the transistor arrangement 3. In the embodiment shown in FIG. 10, the transistor arrangement 3 includes three transistors 31, 32, 3n, connected in series. The voltage tap 2x can be the circuit node between the parallel circuit 1, 14 and the transistor arrangement 3, or can be any of the circuit nodes between two of the transistors 31, 32, 3n of the transistor arrangement 3.

Figure 11:
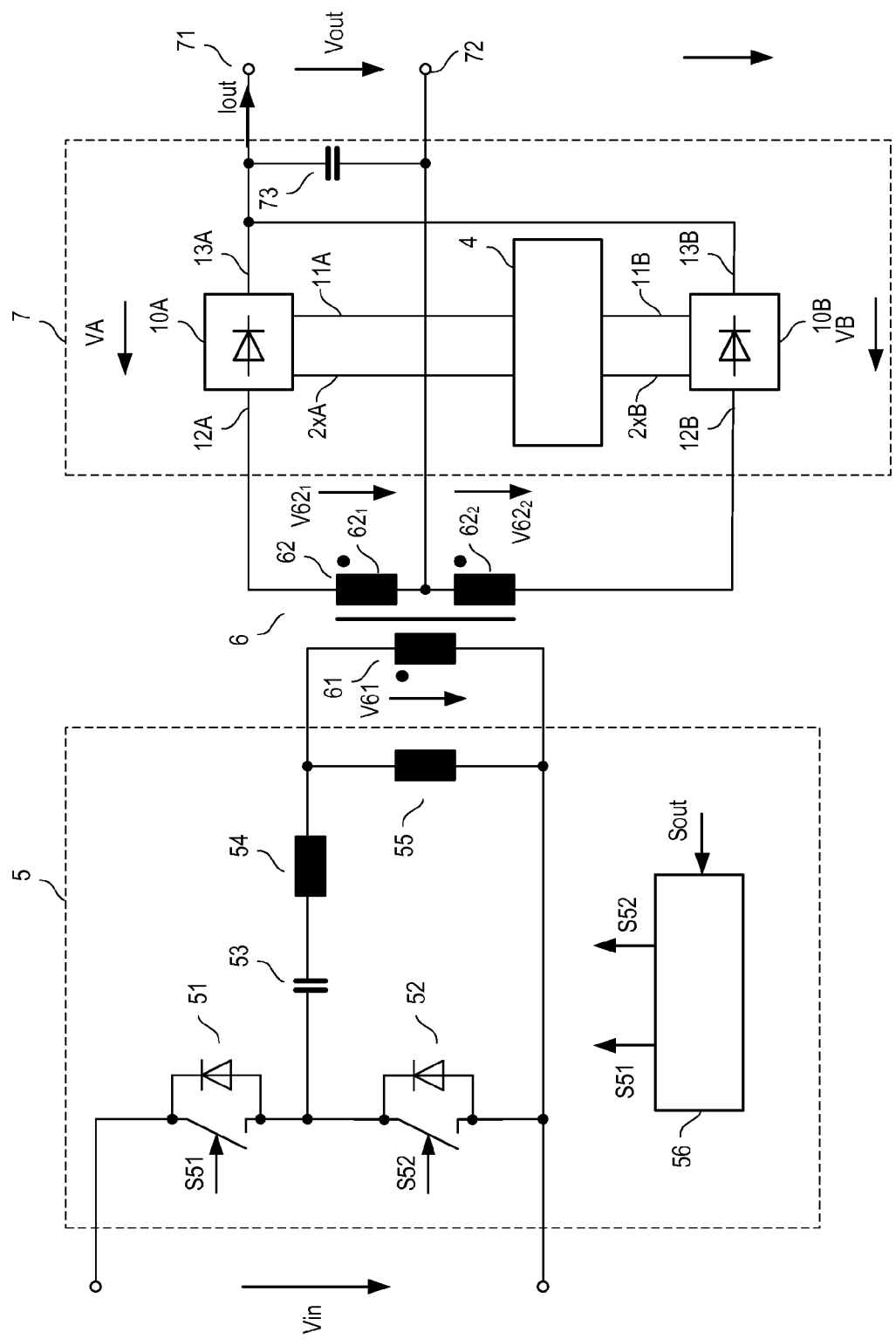
FIG. 11 shows one embodiment of a power converter that includes a circuit arrangement with a first rectifier circuit, a second rectifier circuit, and a drive circuit.

FIG. 11 illustrates one embodiment of an electronic circuit in which the circuit arrangements with the two rectifier circuits 10A, 10B explained herein before may be implemented. The electronic circuit shown in FIG. 11 is a power converter circuit with an input for receiving an input voltage Vin and an output for supplying an output voltage Vout to a load (not illustrated). The power converter circuit includes a transformer 6 that galvanically isolates the input and the output. Further, the power converter circuit includes a switching circuit 5 configured to generate an alternating voltage at a primary winding 61 of the transformer 6 and a rectifier arrangement 7 coupled to a secondary winding 62 of the transformer 6. In the embodiment shown in FIG. 11, the secondary winding 62 has a first winding section $62_1$ and a second winding section $62_2$ and a center tap between the two winding sections $62_1$, $62_2$. The center tap is coupled to the output.

According to one embodiment, the input voltage Vin is higher than the output voltage Vout. The input voltage Vin may be in the range of several 100V, such as 400V, and the output voltage Vout may be in the range of several 10V, such as between 30V and 80V.

In the present embodiment, the switching circuit 5 is implemented with an LLC resonant topology. This LLC resonant topology includes a half-bridge with a high-side switch 51 and a low-side switch 52. The half-bridge is connected to the input for receiving the input voltage Vin. Further, the LLC topology includes a series LLC circuit with a capacitive storage element 53, an inductive storage element 54 and the primary winding 61 of the transformer 6. This series LLC circuit is connected in parallel with the low-side switch 52. A further inductive storage element 55 may represent a stray inductance of the primary winding 61, or may be an additional inductor connected in parallel with the primary winding 61.

A drive circuit 56 drives high-side switch 51 and the low-side switch 52 such that an alternating voltage V61 across the primary winding 61 is generated. In particular, the drive circuit 56 switches on and switches off the high-side switch 51 and the low-side switch 52 alternatingly so that only one of these switches is switched on at the same time. Reference characters S51, S52 denote drive signals of the high-side switch 51 and the low-side switch 52 generated by the drive circuit 56. The drive circuit 56 may generate those drive signals S51, S52 based on an output signal S out. This output signal Sout may represent at least one of the output voltage Vout and an output current Tout; the drive circuit 56 may be configured to drive the half-bridge 51, 52 such that the parameter (output current, output voltage, or output power) represented by the signal Sout has a predefined signal level (current level, voltage level, or power level). The series LLC circuit has two resonance frequencies, namely a first resonance frequency and a second resonance frequency lower than the first resonance frequency. In order to control the power transferred from the primary winding 61 to the secondary winding 62 and, therefore, in order to control the output parameter, the drive circuit 56 operates the switches 51, 52 with a frequency that is typically between the first and the second resonance frequency and close to the first resonance frequency. By varying the switching frequency of the switches 51, 52 the quality factor of the series LLC circuit can be varied, and by varying the quality factor, the power transferred from the primary side to the secondary side of the transformer 6 can be adjusted. This is commonly known so that no further explanations are required in this regard.

In the rectifier arrangement 7, the first rectifier circuit 10A is connected between the first secondary winding section $62_1$ and a first output node 71, the second rectifier circuit 10B is connected between the secondary winding section $62_2$ and the first output node 71, and the center tap of the secondary winding 62 connected to a second output node 72. The output voltage Vout is available between the first and second output nodes 71, 72. Further, an output capacitor 73 may be connected between these output nodes 71, 72. The first and second rectifier circuits 10A, 10B can be implemented in accordance with one of the embodiments explained herein before. One way of operation of the rectifier arrangement shown in FIG. 7 is explained below.

In the power converter circuit shown in FIG. 11, the primary winding 61 and the secondary winding 62 have identical winding senses so that the voltage V61 across the primary winding 61 and voltages $V62_1$, $V62_2$ across the winding sections $62_1$, $62_2$ have the same polarity. In this embodiment, the first rectifier circuit 10A is connected such that the voltage VA substantially equals the output voltage Vout minus the voltage $V62_1$ across the winding section $62_1$. In this embodiment, the first rectifier circuit 10A is forward biased when the voltage $V62_1$ has a polarity as shown in FIG. 11 and when a voltage level of this voltage $V62_1$ is above the output voltage Vout so that energy can be transferred from the secondary winding 62 to the output capacitor 73 and the output 71, 72, respectively. In the power converter circuit shown in FIG. 11, the input voltage Vin and the output voltage Vout have polarities as shown. That is, the output voltage Vout is a positive voltage that is referenced to the second output node 72. According to another embodiment (not shown) of the power converter circuit the polarities of the rectifier elements 10A, 10B are opposite the polarities shown in FIG. 11. In this case, the output voltage Vout is a negative voltage.

The second rectifier circuit 10B is connected such that the voltage VB across the second rectifier circuit 10B equals the output voltage Vout plus the voltage $V62_2$ across this second winding section $62_2$. In this embodiment, the second rectifier circuit 10B is forward biased when the voltage $V62_2$ across the second winding section $62_2$ has a polarity opposite the polarity shown in FIG. 11 and a voltage level above the voltage level of the output voltage Vout. As the voltages $V62_1$, $V62_2$ across the first and second winding sections $62_1$, $62_2$ have identical polarities at the same time, only one of the first and second rectifier circuits 10A, 10B can be forward biased at the same time.

Figure 12:
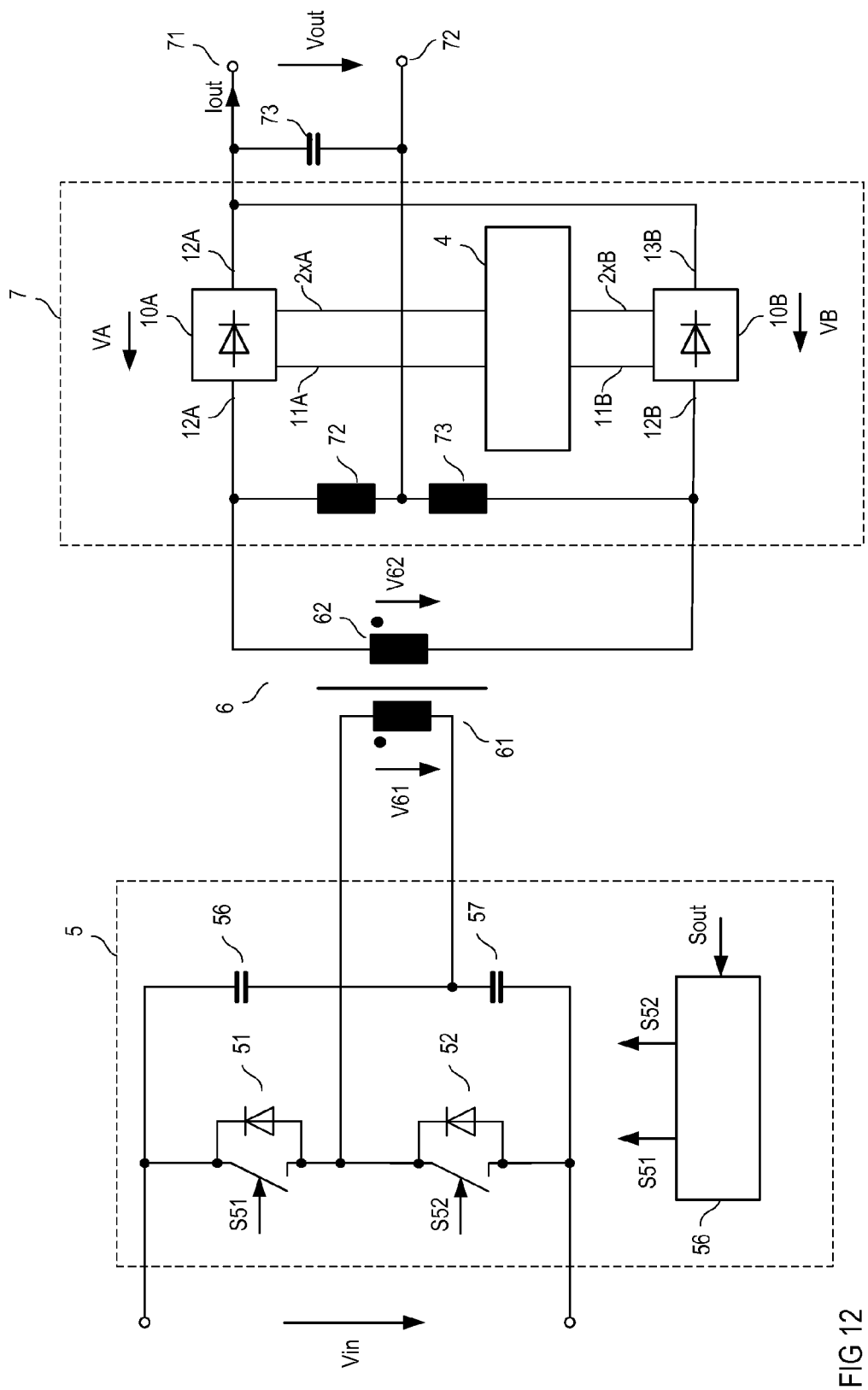
FIG. 12 shows another embodiment of a power converter that includes a circuit arrangement with a first rectifier circuit, a second rectifier circuit, and a drive circuit.
Figure 14:
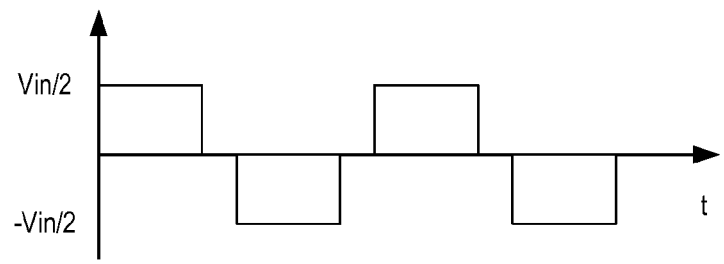
FIG. 14 illustrates one way of operation of the power converters shown in FIGS. 12 and 13.

FIG. 12 illustrates another embodiment of a power converter circuit that includes a circuit arrangement with a first rectifier circuit 10A and a second rectifier circuit 10B according to one of the embodiments explained herein before. In this power converter circuit, the switching circuit 5 includes a half-bridge with a high-side switch 51 and a low-side switch 52. The half-bridge is coupled to the input where the input voltage Vin is available. Further, a capacitive voltage divider with a first capacitor 56 and a second capacitor 57 is connected to the input. The primary winding 61 of the transformer 6 is connected to a tap of the half-bridge and a tap of the capacitive voltage divider. The tap of the half-bridge is the circuit node common to the low-side switch 52 and the high-side switch 51; the tap of the capacitive voltage divider is the circuit node common to the capacitors 56, 57. According to one embodiment, the capacitors 56, 57 have substantially identical capacitances, so that a voltage at the tap of the capacitive voltage divider substantially corresponds to half (50%) of the input voltage (that is Vin/2). In this switching circuit 5, the voltage V61 across the primary winding 61 can have one of three different voltage levels dependent on the operation state of half-bridge 51, 52. These different voltage levels are as follows: +Vin/2 if the high-side switch 51 is switched on and the low-side switch 52 is switched off; 0 if both the high-side switch 51 and the low-side switch 52 are switched off; and −Vin/2 if the high-side switch 51 is switched off and the low-side switch 52 is switched on. A timing diagram of this primary voltage V61 generated by the switching circuit 5 is schematically illustrated in FIG. 14.

Referring to FIG. 12, the rectifier arrangement 7 includes a first inductor 72 connected between a first load of the secondary winding 62 and the second output node 72, and a second inductor 73 connected between a second node of the secondary winding 62 and the second output node 72. The first rectifier circuit 10A is connected between the first node of the secondary winding 62 and the first output node 71, and the second rectifier circuit 10B is connected between the second node of the secondary winding 62 and the first output node 71. The primary winding 61 and the secondary winding 62 have identical winding senses so that a polarity of the voltage V61 across the primary winding 61 equals the polarity of the voltage V62 across the secondary winding 62. The first rectifier circuit 10A and the second rectifier circuit 10B are connected such that the first rectifier circuit 10A is forward biased when the voltage V62 across the secondary winding 62 has a polarity as shown in FIG. 12 and when a voltage level of this voltage V62 is above a voltage level of the output voltage Vout. In this case, the second rectifier circuit 10B is reverse biased. The second rectifier circuit 10B is forward biased and the first rectifier circuit 10A is reverse biased if the voltage V62 across the secondary winding 62 has a polarity opposite the polarity shown in FIG. 12. When the secondary winding 62 has the polarity as shown in FIG. 12, a current flows from the secondary winding through the first rectifier circuit 10A, the output capacitor 73 and the load (not shown), and the second inductor 73. When the secondary side voltage V62 turns zero, this current, driven by the second inductor 73, continues to flow until the second inductor 73 has been demagnetized. When the voltage V62 has the opposite polarity as shown in FIG. 12, the current flows through the second rectifier circuit 10B, the output capacitor 73 and load (not shown), and the first inductor 72. This current continuous to flow, driven by the first inductor 72, until the inductor 72 has been demagnetized after the secondary side voltage V62 has turned to zero.

Figure 13:
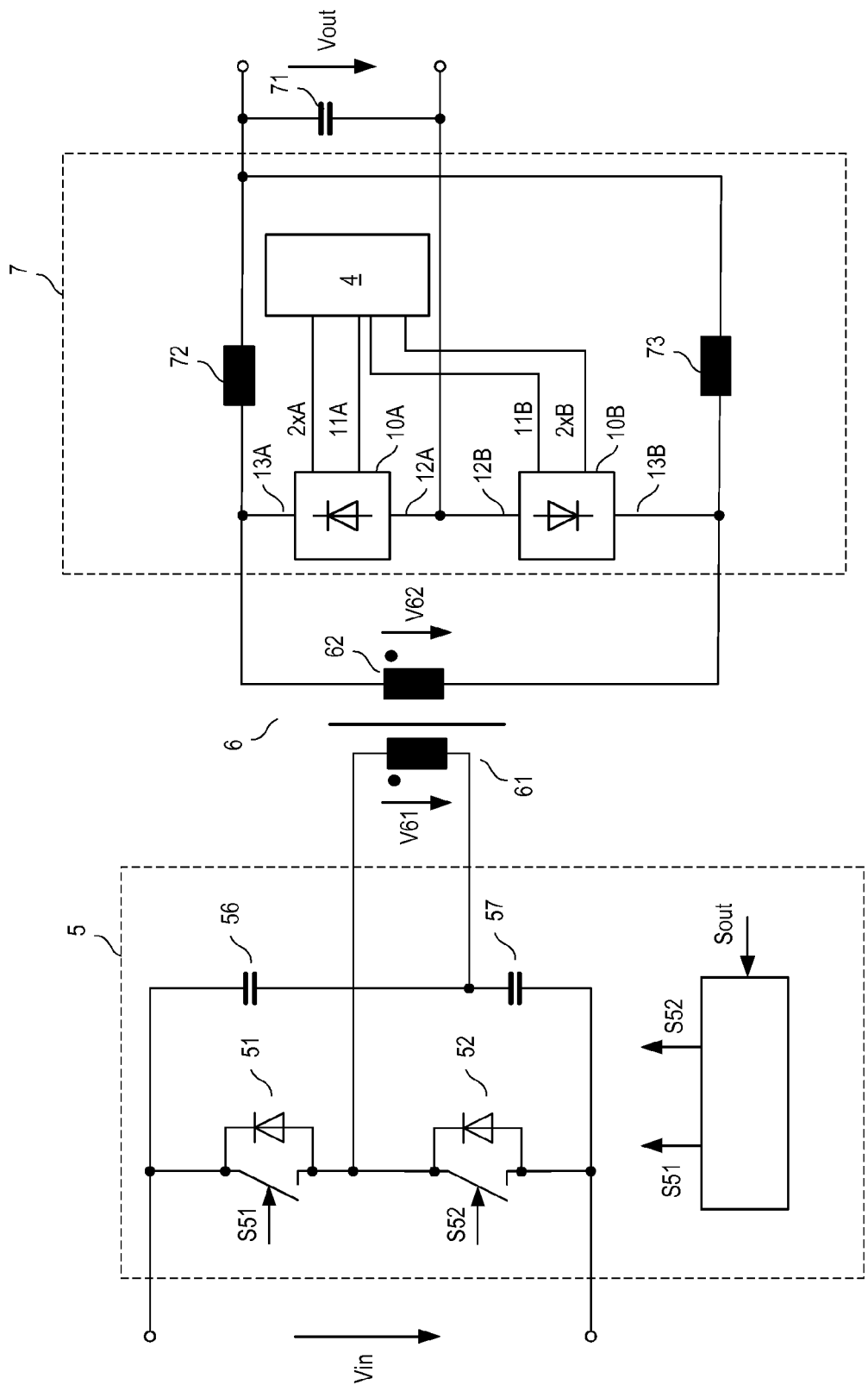
FIG. 13 shows a modification of the power converter shown in FIG. 12.

FIG. 13 shows a modification of the power converter circuit shown in FIG. 12. In this power converter circuit, the positions of the first inductor 72 and the first rectifier circuit 10A are changed in the rectifier arrangement 7, and the position of the second rectifier circuit 10B and the second inductor 73 are changed as compared to the converter shown in FIG. 12. In this embodiment, the second rectifier circuit 10B is forward biased when the secondary side voltage V62 has a polarity as shown in FIG. 30, while the first rectifier circuit 10A is reverse biased. The first rectifier circuit 10A is forward biased when the secondary side voltage V62 has a polarity opposite the polarity shown in FIG. 13. In this case, the second rectifier circuit 10B is reverse biased. The operating principle of the rectifier arrangement 7 shown in FIG. 13 is explained below.

When the secondary side voltage V62 has a polarity as shown in FIG. 13, a current flows through the first inductor 72, the output capacitor 71 and the load (not shown), and the second rectifier circuit 10B. When the secondary side voltage V62 turns to zero, a current, driven by the first inductor 72 continuous to flow to the output capacitor 71 and the load, and the first rectifier circuit 10A until the first inductor 72 has been demagnetized. When the secondary side voltage V62 has a polarity opposite the polarity shown in FIG. 13, a current flows from the secondary winding 62 through the second inductor 73, the output capacitor 71 and the load, and the first rectifier circuit 10A. When the secondary side voltage V62 turns zero, the current, driven by the second inductor 73, continuous to flow through the output capacitor 71 and the load, but instead of the first rectifier circuit 10A flows through the second rectifier circuit 10B.

In each of the power converter circuits shown in FIGS. 11-13 only one of the first and second rectifier circuits 10A, 10B is forward biased at the same time. Each of the circuit arrangements with the first rectifier circuit 10A and the second rectifier circuit 10B explained herein before, may be used in each of the power converter circuits shown in FIGS. 11-13. Although in FIGS. 11-13 each of the first and second rectifier circuits 10A, 10B is drawn to have a drive input 11A, 11B and a voltage tap 2xA, 2xB it should be noted that dependent on this specific implementation one or more of these taps or inputs can be omitted.

Figure 15:
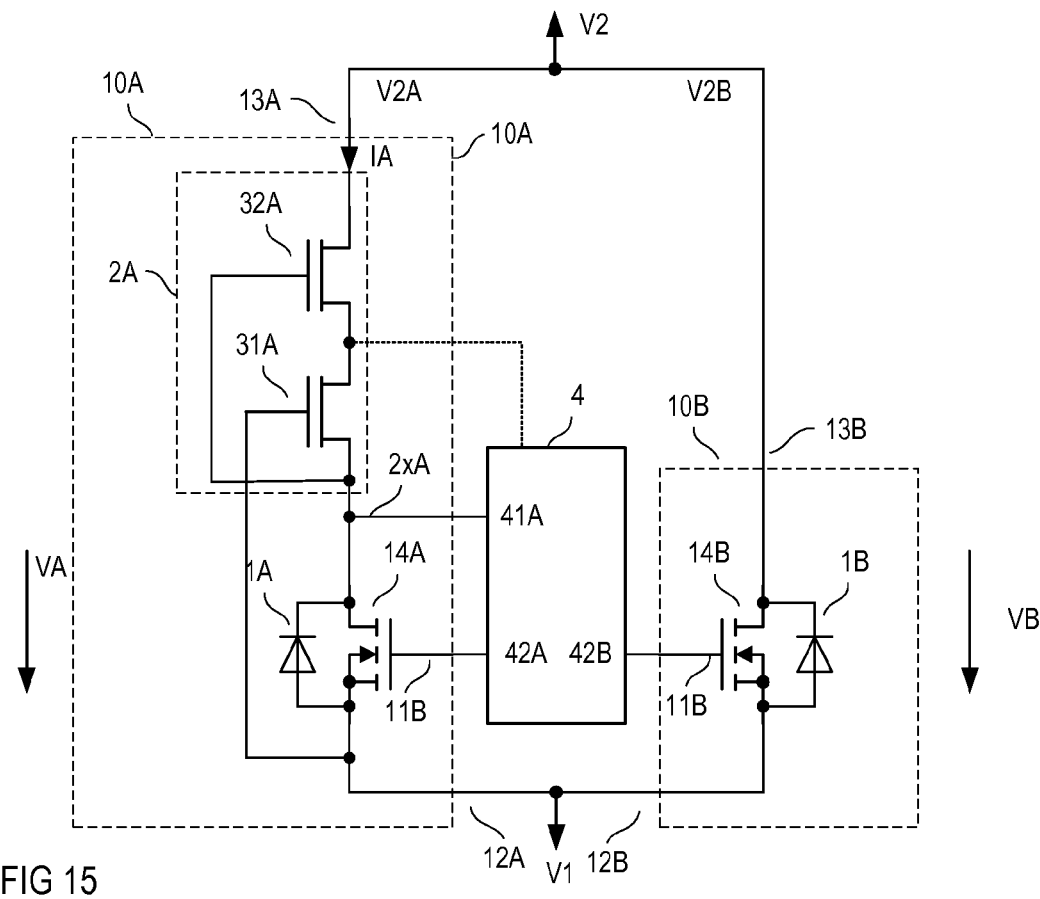
FIG. 15 shows another embodiment of a circuit arrangement including a first rectifier circuit, a second rectifier circuit, and a drive circuit.

FIG. 15 shows another embodiment of a circuit arrangement with a first rectifier circuit 10A and a second rectifier circuit 10B. This circuit arrangement is based on the circuit arrangement shown in FIG. 4, wherein in the embodiment shown in FIG. 15 the two rectifier circuits 10A, 10B are connected in parallel. That is, the electrical potentials V2A, V2B at the second load nodes 13A, 13B are identical. Like in the embodiment shown in FIG. 3, the drive circuit 4 receives a tap voltage from the first rectifier circuit 10A and is configured to drive the transistor 14A in the first rectifier circuit 10A and the transistor 14B in the second rectifier circuit 10B. The transistor 14A in the first rectifier circuit 10A is optional and, as shown in FIG. 1, may be omitted.

According to one embodiment, the drive circuit 4 is configured to sense the operation state of the first rectifier circuit 10A and to drive the transistors 14A, 14B based on this operation state. That is, the drive circuit 4 may be configured to switch on transistors 14A, 14B when the first rectifier circuit 10A is forward biased. The biasing state of the first rectifier circuit 10A can be detected as explained herein below. That is, the polarity of the current IA and/or the polarity of the voltage VA may be sensed. The polarity of the overall voltage VA corresponds to the polarity of the tap voltage, the polarity of the tap voltage will be used to detect the operation state of the first rectifier circuit 10A.

Figure 16:
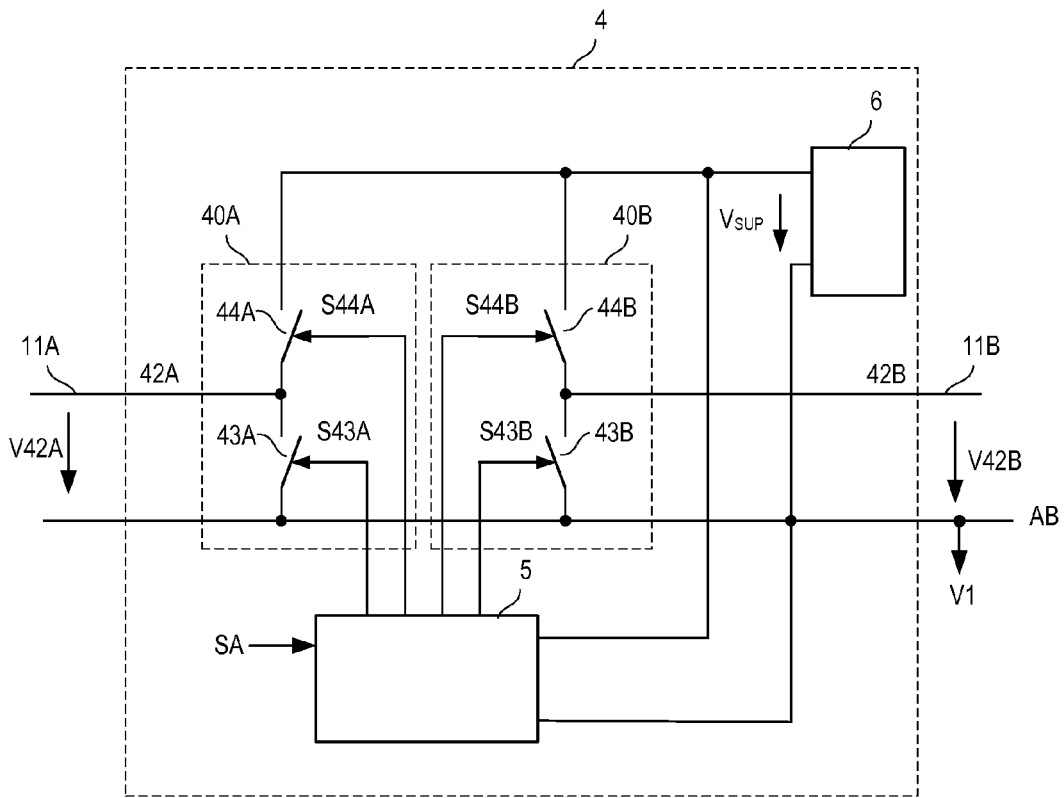
FIG. 16 shows one embodiment of a drive circuit.

FIG. 16 shows one embodiment of the drive circuit 4. This drive circuit 4 corresponds to the drive circuit shown in FIG. 5 with the difference that the controller 5 only receives the status signal SA of the first rectifier circuit 10A. The supply circuit 6 of the drive circuit 4 shown in FIG. 16 may correspond to the supply circuit shown in FIG. 3.

The drive circuit 4 can be configured to switch the transistors 14A, 14B simultaneously. However, this is only an example. According to another embodiment, there may be time delays between switching the two transistors 14A, 14B. This may help to prevent cross conduction or current shoot through.

In the circuit arrangement with the two rectifier circuits 10A, 10B and the drive circuit 4 explained before, the rectifier circuits 10A, 10B can be integrated in a common semiconductor body (die) and the drive circuit 4 can be integrated in a semiconductor body (die) separate therefrom. According to another embodiment, each of the rectifier circuits 10A, 10B and the drive circuit 4 is integrated in a semiconductor body of its own. According to yet another embodiment, the rectifier circuits 10A, 10B and the drive circuit 4 are integrated in a common semiconductor body.

In the embodiments explained herein before, the first rectifier circuit 10A, which supplies power to the drive circuit 4 in order to drive the second rectifier circuit 10B, includes a series circuit with a rectifier element 1A and several transistors 31A, 32 A. In these embodiments the voltage tap 2xA from where the power may be received is a connection point between the rectifier element 1A and one 31A of the transistors, or is a connection point between two of the transistors. This, however, is only an example. According to another embodiment, the rectifier circuit includes (only) one semiconductor device and the voltage tap is a tap of an internal load path of this semiconductor device. One embodiment of such semiconductor device is shown in FIG. 17.

Figure 17:
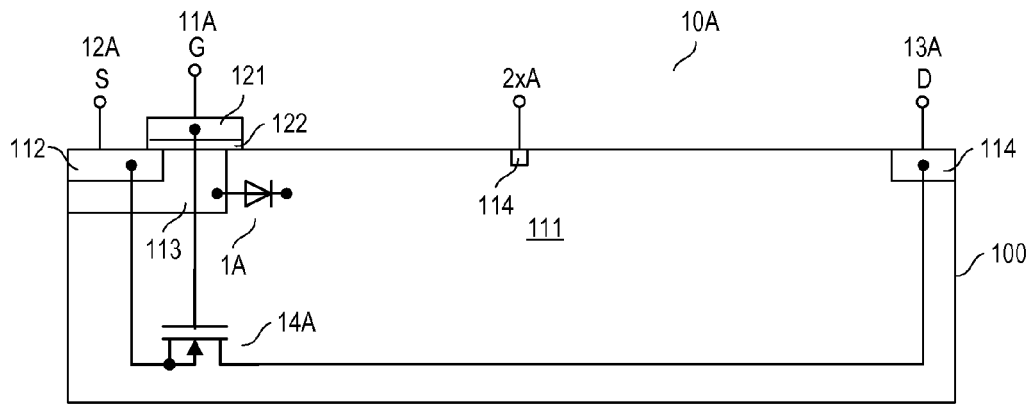
FIG. 17 shows a vertical cross sectional view of a rectifier circuit according to another embodiment.

FIG. 17 shows a vertical cross sectional view of a rectifier circuit 10A that includes a MOSFET with an internal body diode. The MOSFET includes, in a semiconductor body 100, a drift region 111 of a first doping type, a source region 112 of the first doping type, a drain region 114 of the first doping type, and a body region 113 of a second doping type complementary to the first doping type. The drift region 111 has a lower doping concentration than each of the source and drain regions 112, 114. The body region 113 separates the source region 112 from the drift region 111, and the drift region 111 is arranged between the body region 113 and the drain region.114. A gate electrode 121 is adjacent the body region 113 and is dielectrically insulated from the body region 113 by a gate dielectric 122. The gate electrode 121, in a conventional way, serves to control a conducting channel in the body region 113 between the source region 112 and the drift region 111. The MOSFET is in an on-state when the gate electrode 121 is driven such that there is a conducting channel in the body region 113 along the gate dielectric 122, and the MOSFET is in the off-state when the conducting channel is interrupted.

Referring to FIG. 17, the source region 112 is connected to a source node S, the drain region 114 is connected to a drain node D, and the gate electrode is connected to a gate node. In this embodiment, the source node forms the first load node 12A of the rectifier circuit 10A, the drain node D forms the second load node 13A, and the gate node G forms the control node 14A. In FIG. 17, not only the individual device regions but also the circuit symbols of the MOSFET 14A and the internal body diode 1A are shown. Reference characters 1A denotes the circuit symbol of the internal body diode, which is formed between the body region 113 and the drift region 111 (and drain region 114). The internal body diode forms the rectifier element of the rectifier circuit 10A. Reference character 14A denotes the circuit symbol of the MOSFET. The circuit symbols shown in FIG. 17 apply to an n-type MOSFET. In this case, the first doping type is an n-type and the second doping type is a p-type. However, the rectifier circuit 10A may be implemented with a p-type MOSFET as well.

Referring to FIG. 17, the rectifier circuit 10A further includes a voltage tap 2xA. In this embodiment, the voltage tap 2xA is connected to a tap region 114 in the drift region. The tap region may be of the second doping type. The tap region is located between the body region 113 and the drain region 114 and spaced apart from each of these regions 113, 114.

One way of operation of the rectifier circuit shown in FIG. 17 is explained in the following. For the purpose of explanation it is assumed that the MOSFET is in the off-state and that a voltage is applied between the first and second load node 12A, 12B that reverse biases the pn-junction (the body diode 1A) between the body region 113 and the drift region 111. In this case, a space charge region (depletion region) expands in the drift region 111 beginning at the body region 113, whereas along a path between the body region 113 and the drain region 114 the electrical potential in the depletion region increases as the distance to the body region 113 increases. The tap region 114 "taps" the electrical potential at that position in the drift region 111 where it is located. When the tap region 114 is distant from the drain region 114 and when the voltage applied between the load nodes 12A, 13A is such that the depletion region extends beyond the tap region 114, then the electrical potential at the tap region 114 is between the electrical potential at the first load node 12A and the electrical potential at the second load node 13A. Thus, the functionality of the voltage tap 2xA shown in FIG. 17 is the same as the functionality of the voltage tap 2xA shown in the other figures explained herein before. Although various exemplary embodiments of the invention have been disclosed, it will be apparent to those skilled in the art that various changes and modifications can be made which will achieve some of the advantages of the invention without departing from the spirit and scope of the invention. It will be obvious to those reasonably skilled in the art that other components performing the same functions may be suitably substituted. It should be mentioned that features explained with reference to a specific figure may be combined with features of other figures, even in those cases in which this has not explicitly been mentioned. Further, the methods of the invention may be achieved in either all software implementations, using the appropriate processor instructions, or in hybrid implementations that utilize a combination of hardware logic and software logic to achieve the same results. Such modifications to the inventive concept are intended to be covered by the appended claims.

Spatially relative terms such as "under," "below," "lower," "over," "upper" and the like, are used for ease of description to explain the positioning of one element relative to a second element. These terms are intended to encompass different orientations of the device in addition to different orientations than those depicted in the figures. Further, terms such as "first," "second" and the like, are also used to describe various elements, regions, sections, etc. and are also not intended to be limiting Like terms refer to like elements throughout the description.

As used herein, the terms "having," "containing," "including," "comprising" and the like are open ended terms that indicate the presence of stated elements or features, but do not preclude additional elements or features. The articles "a," "an" and "the" are intended to include the plural as well as the singular, unless the context clearly indicates otherwise.

With the above range of variations and applications in mind, it should be understood that the present invention is not limited by the foregoing description, nor is it limited by the accompanying drawings. Instead, the present invention is limited only by the following claims and their legal equivalents.

What is claimed is:

1. A circuit arrangement, comprising:
    a first rectifier circuit comprising a load path and a voltage tap;
    a second rectifier circuit comprising a load path and a drive input, and configured to be switched on and off by a drive signal received at the drive input; and
    a drive circuit comprising a first supply input coupled to the voltage tap of the first rectifier circuit and a first drive output coupled to the drive input of the second rectifier circuit,
    wherein the load path of the first rectifier circuit and the load path of the second rectifier circuit are coupled to a common circuit node, and
    wherein the drive circuit is configured to drive at least the second rectifier circuit using electrical power received from the voltage tap of the first rectifier circuit.

2. The circuit arrangement of claim 1, wherein the load path of the first rectifier circuit and the load path of the second rectifier circuit are connected in parallel.

3. The circuit arrangement of claim 2, wherein the second rectifier circuit comprises:
    a transistor comprising a drive node coupled to the drive input of the second rectifier circuit and a load path; and
    a rectifier element,
    wherein the rectifier element is connected in parallel with the load path of the transistor, and
    wherein the load path of the transistor forms the load path of the second rectifier circuit.

4. The circuit arrangement of claim 3, wherein the drive circuit is configured
    to detect at least one of a current through the first rectifier circuit and a voltage across the first rectifier circuit, and
    to drive the second rectifier circuit in an on-state based on the at least one of the detected current and the detected voltage.

5. The drive circuit of claim 4, wherein the drive circuit is configured to drive the second rectifier circuit in the on-state when the current through the first rectifier circuit has a predefined current direction.

6. The drive circuit of claim 4, wherein the drive circuit is configured to drive the second rectifier circuit in the on-state when the voltage across the first rectifier circuit has a predefined polarity.

7. The circuit arrangement of claim 2, wherein
    the first rectifier circuit comprises a drive input and is configured to be switched on and off by a drive signal received at the drive node,
    the drive circuit comprises a second drive output coupled to the drive node of the first rectifier circuit, and
    the drive circuit is configured to drive the first rectifier circuit using electrical power received from the voltage tap of the first rectifier circuit.

8. The circuit arrangement of claim 7, wherein the drive circuit comprises an energy storage coupled to the first supply input.

9. The circuit arrangement of claim 7, wherein the first rectifier circuit comprises:
    a first transistor having a drive node and a load path; and
    at least one second transistor having a drive node and a load path,
    wherein the load path of the first transistor and the load path of the at least one second transistor are connected in series and form the load path of the first rectifier circuit,
    wherein the drive node of the first transistor is coupled to the drive input of the first rectifier circuit,
    wherein the at least one second transistor is configured to be driven directly or indirectly by the first transistor, and
    wherein the voltage tap of the first rectifier circuit is coupled to a circuit node between the load path of the first transistor and the load path of the at least one second transistor.

10. The circuit arrangement of claim 9, wherein a rectifier element is connected in parallel with the first transistor.

11. The circuit arrangement of claim 9, wherein the first transistor is a normally-on transistor and the at least one second transistor is a normally-off transistor.

12. The circuit arrangement of claim 9,
    wherein the first rectifier circuit comprises a plurality of second transistors each having a load path,
    wherein the load paths of the second transistors are connected in series, and
    wherein each of the plurality of second transistors is configured to be driven directly or indirectly by the first transistor.

13. The circuit arrangement of claim 1, wherein
    the first rectifier circuit further comprises a drive input and is configured to be switched on and off by a drive signal received at this drive input,
    the drive circuit comprises a second drive output coupled to the drive input of the first rectifier circuit.

14. The circuit arrangement of claim 13, wherein the drive circuit is configured to drive the first rectifier circuit using electrical energy received at the first supply input.

15. The circuit arrangement of claim 14, wherein the drive circuit comprises an energy storage coupled to the first supply input.

16. The circuit arrangement of claim 13, wherein
    the second rectifier circuit comprises a voltage tap,
    the drive circuit comprises a second supply input coupled to voltage tap of the second rectifier circuit, and
    the drive circuit is configured to drive the first rectifier circuit using electrical energy received from the voltage tap of the second rectifier circuit.

17. The circuit arrangement of claim 13, wherein the drive circuit is configured
    to detect at least one of a current through the first rectifier circuit and a voltage across the first rectifier circuit, and
    to drive the second rectifier circuit in an on-state based on the at least one of the detected current and the detected voltage.

18. The drive circuit of claim 17, wherein the drive circuit is configured to drive the second rectifier circuit in the on-state when the current through the first rectifier circuit has a predefined current direction.

19. The drive circuit of claim 17, wherein the drive circuit is configured to drive the second rectifier circuit in the on-state when the voltage across the first rectifier circuit has a predefined polarity.

20. The circuit arrangement of claim 13, wherein the drive circuit is configured
- to detect at least one of a current through the second rectifier circuit and a voltage across the second rectifier circuit, and
- to drive the first rectifier circuit in an on-state based on the at least one of the detected current and the detected voltage.

21. The circuit arrangement of claim 13, wherein each of the first rectifier circuit and the second rectifier circuit comprises:
- a first transistor having a drive node and a load path; and
- at least one second transistor having a drive node and a load path,
- wherein the load path of the first transistor and the load path of the at least one second transistor are connected in series and form the load path of the respective rectifier circuit,
- wherein the drive node of the first transistor is coupled to the drive input of the respective rectifier circuit,
- wherein the at least one second transistor is configured to be driven directly or indirectly by the first transistor, and
- wherein the voltage tap of the respective rectifier circuit is coupled to a circuit node between the load path of the first transistor and the load path of the at least one second transistor.

22. The circuit arrangement of claim 21,
- wherein at least one of the first rectifier circuit and the second rectifier circuit comprises a plurality of second transistors each having a load path,
- wherein the load paths of the second transistors are connected in series, and
- wherein each of the plurality of second transistors is configured to be driven directly or indirectly by the first transistor.

23. A method comprising:
- receiving by a drive circuit electrical power from a voltage tap of a first rectifier circuit comprising a load path and a voltage tap; and
- using the electrical power by the drive circuit to drive a second rectifier circuit comprising a load path,
- wherein the load path of the first rectifier circuit and the load path of the second rectifier circuit are coupled to a common circuit node.

24. The method of claim 23, wherein the load path of the first rectifier circuit and the load path of the second rectifier circuit are connected in parallel.

* * * * *